United States Patent [19]
Nishimura

[11] 3,929,043
[45] Dec. 30, 1975

[54] METHOD AND APPARATUS FOR FINISHING PNEUMATIC TIRES

[75] Inventor: Seiichiro Nishimura, Tokyo, Japan

[73] Assignee: Bridgestone Tire Company Limited, Tokyo, Japan

[22] Filed: Sept. 24, 1974

[21] Appl. No.: 508,760

Related U.S. Application Data

[62] Division of Ser. No. 257,531, May 30, 1972, Pat. No. 3,851,697.

[30] Foreign Application Priority Data

June 7, 1971 Japan.................................. 46-39277

[52] U.S. Cl.................. 82/1 C; 82/13; 157/13
[51] Int. Cl.²... B23B 3/00; B23B 3/22; B29H 21/08
[58] Field of Search.......... 82/1 C, 1, 13, 86; 157/13

[56] References Cited
UNITED STATES PATENTS

| 3,260,297 | 7/1966 | Ebers | 157/13 |
| 3,473,596 | 10/1969 | Meixner | 157/13 |
| 3,478,804 | 11/1969 | Meixner | 157/13 |
| 3,483,911 | 12/1969 | Miller | 157/13 |
| 3,856,070 | 12/1974 | Christie et al. | 157/13 X |

Primary Examiner—Harrison L. Hinson
Attorney, Agent, or Firm—Fleit & Jacobson

[57] ABSTRACT

A method and an apparatus for finishing pneumatic tires in which a comblike blade supported on a swingable holder is brought into slight contact with one shoulder of a tread of a rotating tire at a certain angle and then moved in a direction at right angles to the rotating axis of the tire and a pair of comblike blades supported on respective swingable holders are brought into slight contact with the sides of the rotating tire and then moved toward each other to cause the comblike blades to sweep over the sectional profiles in tangential direction, thereby trimming spew pips on the molded and vulcanized tires in succession automatically detecting difference in sectional profile regardless of sizes and kinds of tires.

4 Claims, 17 Drawing Figures

METHOD AND APPARATUS FOR FINISHING PNEUMATIC TIRES

This is a divisional application of application Ser. No. 257,531 filed May 30, 1972, now U.S. Pat. No. 3,851,697.

BACKGROUND OF THE INVENTION

1. Field of the Invention

This invention relates to a method and an apparatus for finishing pneumatic tires and more particularly to an improved method and apparatus for automatically trimming molding spew pips and other fins from tires rotating about their axes which have been molded and vulcanized.

2. Description of the Prior Art

In general, a pneumatic tire mainly made of rubber or the similar material is first formed as a green case on a molding drum and then molded in the form of its final shape by means of a tire forming vulcanizing press.

In such a forming process, it cannot be avoided that the rubber tires thus obtained is inherently formed on its outer surfaces with a number of spew pips and fins at the boundaries of mold halves, which spew pips are indispensable for fitting the molded tire with a mold of the forming vulcanizing press.

In prior art, removal of such spew pips has usually been effected by manual operating a clipper-like tool, which requires high operator's skill and is inefficient in operation to obstruct the improvement of productivity in finishing process of tires, while the tip of a blade of the clipper-like tool may bite the tire body to cause damage to its surface and even there may be a risk of the operator being injured by the tip of the blade.

To solve this problem, it has been suggested that movement of a spew pip trimming cutter along the outer surface of a tire is forcedly effected while it is rotated. This method somewhat succeeded in automation and mechanization of finishing process of tires. In practical production of tires, however, only one kind of tires is not always transferred to a finishing station, but more than one hundred kinds of tires different in type come from respective forming vulcanizing presses into the finishing station in succession. In accordance with the above suggested prior art, such various kinds of tires must first be classified by type or kind prior to the transferring of tires to the finishing station, which classification of the various kinds of tires requires much time which is obviously inacceptable for reasons of the rate of operation since the time required for the finishing process is much shorter than that for the vulcanizing process.

SUMMARY OF THE INVENTION

It is, therefore, a primary object of the present invention to provide a method and an apparatus capable of automatically detecting sectional profiles of particular tires by simple operation to perform precise trimming spew pips on the tires regardless of sizes and kinds of the tires.

It is an another object of the present invention to provide a method and an apparatus which can be applied to existing production processes to perform automatic trimming spew pips on molded and vulcanized tires coming from a number of tire forming vulcanizing presses in succession irrespective of their sizes and kinds thereby improving the productivity in finishing processes of the tires.

In order to accomplish these objects the method of finishing pneumatic tires according to the invention comprises steps of bringing cutting edges of comblike blades into slight contact with profiles in sectional planes parallel to the rotating axis in tangential direction to the profiles, said blades being mounted on swingable holders pivotally movable about axes intersecting planes including the rotating axis of the tire to be treated, and translationally moving the respective pivotal connections of said swingable holders in planes parallel to said sectional planes whereby guiding said cutting edges of said comblike blades so as to envelope said profiles of the tire.

More particularly, the apparatus for finishing pneumatic tires according to the invention comprises means rotatingly driving a molded vulcanized rubber tire and having at least three rollers supportingly in contact with its tread surface of the tire, swingable holders including comblike blades extending in tangential direction to a profile in sectional planes parallel to the rotating axis of said tire and counterbalances serving to bring the cutting edges of said blades into slight contact with said profile, and carriages for translationally carrying said swingable holders in planes parallel to said sectional plaines as a whole.

The characteristic features of the invention will become more apparent and more readily understandable by the following description and the appended claims when read in conjunction with accompanying drawings.

BRIEF DESCRIPTION OF THE DRAWINGS

FIG. 12b is a sectional side view of the cutting edges shown in FIG. 12a;

FIG. 13 is a sectional view taken along lines 13—13 in FIG. 12a;

FIG. 16 is a longitudinal sectional view of base of cutting edges of the blade shown in FIG. 14;

DESCRIPTION OF THE PREFERRED EMBODIMENTS

A preferred embodiment of the invention will be explained in detail hereinafter with reference to the drawings.

Figure 1:
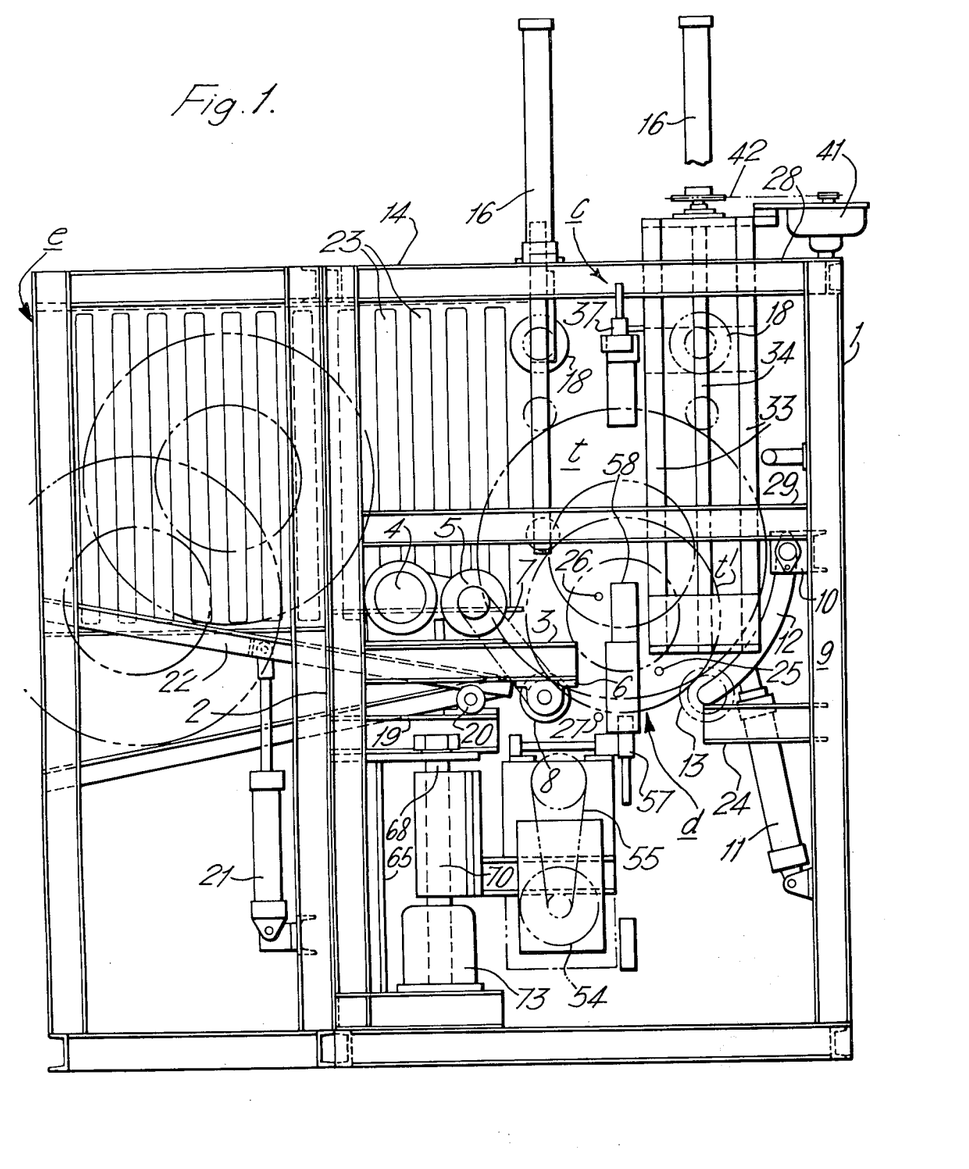
FIG. 1 is a sectional side view of one embodiment of the apparatus according to the invention showing steps of trimming spew pips.
Figures 2, 5:
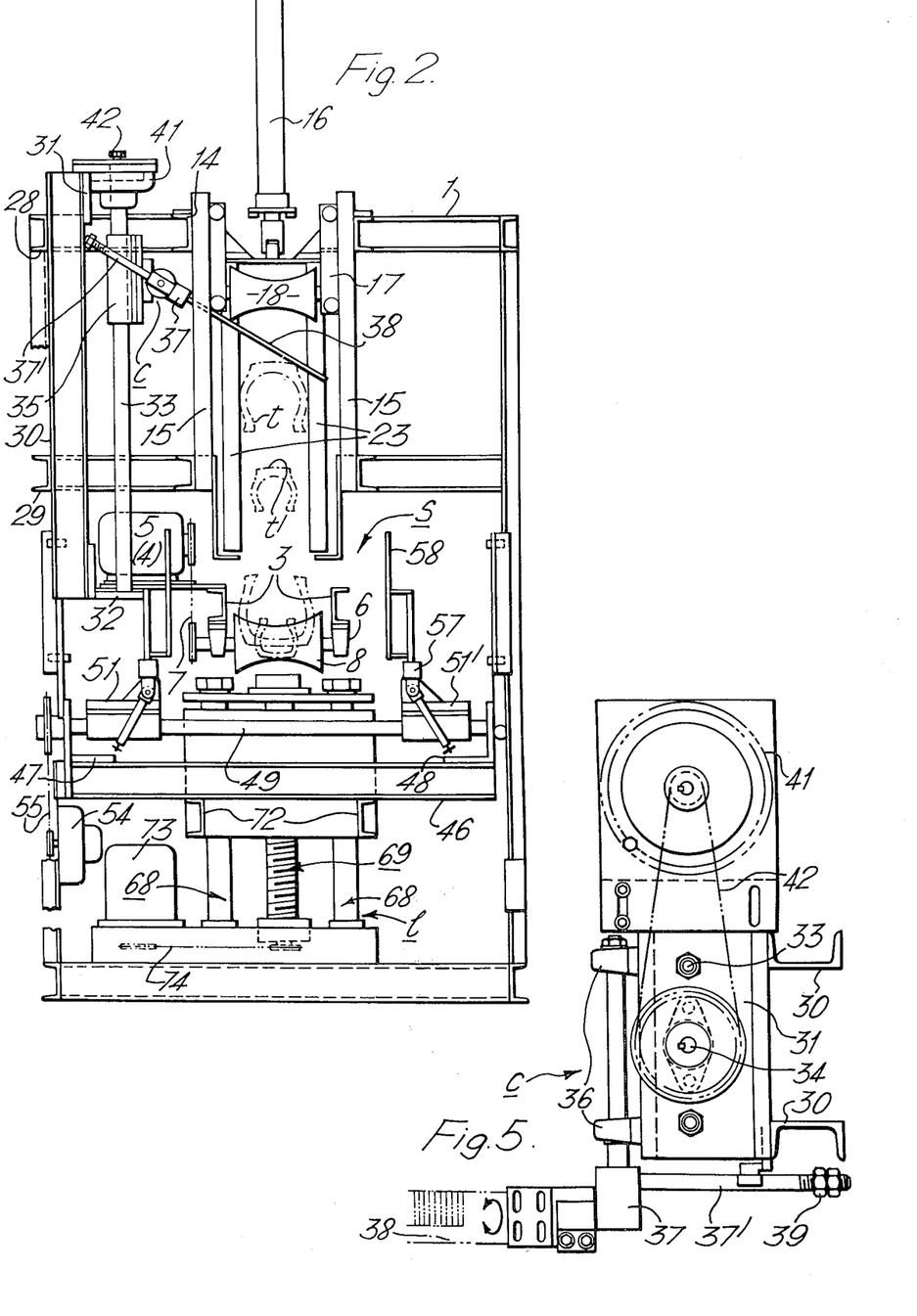
FIG. 2 is a sectional front elevation of the apparatus shown in FIG. 1.
FIG. 5 is a plan view of the cutting post shown in FIG. 3.

FIGS. 1 and 2 show one preferred embodiment of the apparatus for carrying out the method according to the invention.

A frame 1 made of channel members erected as an upstanding frame comprises a rotating driving system $d$ consisting of a concave driving roller 8, a similarly concave driven roller 13 pivotally mounted in opposition thereto and a similarly concave restraining roller 18 rotatably mounted on the end of a slide 17 adapted to be raised and lowered by a thruster 16 along guides 15 depending from a top beam 14 of the frame 1. The concave driving roller 8 is forced to be rotated by means of a driving system consisting of a motor 4, reduction means 5 off-centrally mounted together with the motor on brackets 3 of intermediate columns 2, bearings 6 fixed to the brackets 3 and a chain 7, and the concave driven roller 13 mounted on the end of a support 12 which is swingable by means of a thruster 11 and pivotally connected to a bracket 10 of a front column 9 of the frame 1. In addition to the driving system $d$, the frame 1 is provided with a tire supply and eject port $e$ consisting of an inclined reversible chute 22 pivotally connected at a bearing 20 to a bracket 19 of the intermediate columns 2 and pivotally movable by means of a thruster 21 about the bearing 20 and guide rollers 23 upstandingly guiding tires rolling down on the chute 22 to ensure that the molded and vulcanized tires $t$ are introduced onto the driving and driven rollers 8, 13 and ejecting them after spew pips have been trimmed which will be described in detail hereinafter, and the frame 1 is further provided with a crown cutting post $c$ for trimming spew pips on the tread of the tire $t$ held on the driving and driven rollers 8, 13 with the aid of the restraining roller 18 and a pair of side cutting posts $s$ positioned one either side of the tire $t$ for trimming spew pips on the side surfaces of the tire.

Figures 3, 4:
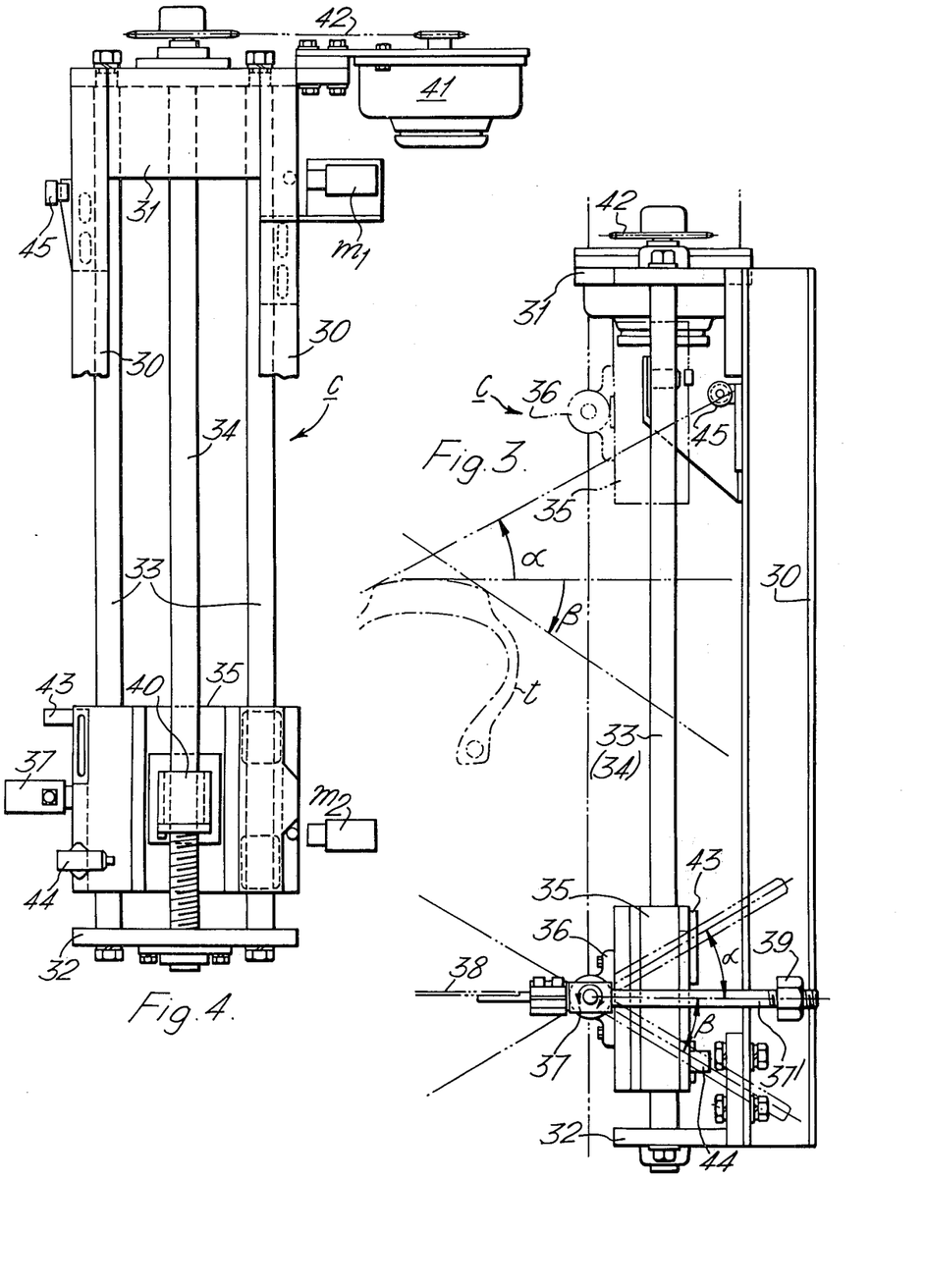
FIG. 3 is a front elevation of a crown cutting post incorporated in the apparatus shown in FIG. 1.
FIG. 4 is a side view of the cutting post shown in FIG. 3.

In FIGS. 1 and 3, the apparatus further comprises a stopper 24 for determining the normal return position of the driven roller 13, a photoelectric tube 25 for detecting the introduction of the tire $t$, a further photoelectric tube 26 for detecting the difference in size of the tires, and a still further photoelectric tube 27 for controlling the side cutting posts $s$ (which will be explained in detail hereinafter).

The crown cutting post $c$, as shown in FIGS. 3–5, includes a pair of guide rods 33 and a feed screw 34 extending between angle plates 31, 32 fixed to the upper and lower ends of an upstanding base 30 mounted on side frames 28, 29 of the frame 1, a carriage 35 adapted to be raised and lowered by means of the feed screw 34 along the guide rods 33, and a swingable holder 37 pivotally connected to the carriage 35 by bearings 36 and carrying a blade 38 in the form of a comb fixed thereto, which is adapted to be brought into slight contact with the tread of the tire $t$ by means of a counterbalance 39 supported on a rod 37' adjustable as by screw threads. The comblike blade will be explained in detail hereinafter.

FIGS. 3–5 illustrate a driving system for the carriage 35 consisting of a motor 41 with brake means driving the feed screw 34, a chain 42 and a sprocket fixed to the end of the feed screw 34 which is connected to the carriage 35 through a nut 40. A stopper 43 serves to set an initial inclined angle $\alpha$ of the swingable holder 37 and a return switch 44 serves to reverse the rotation of the motor 41 at the instant when the holder 37 assumes a final position corresponding to a final inclined angle $\beta$. When the carriage 35 assumes its uppermost position, a stopper 45 holds the holder 37 substantially horizontally to provide greater ease in introduction of the tire $t$.

Figure 6:
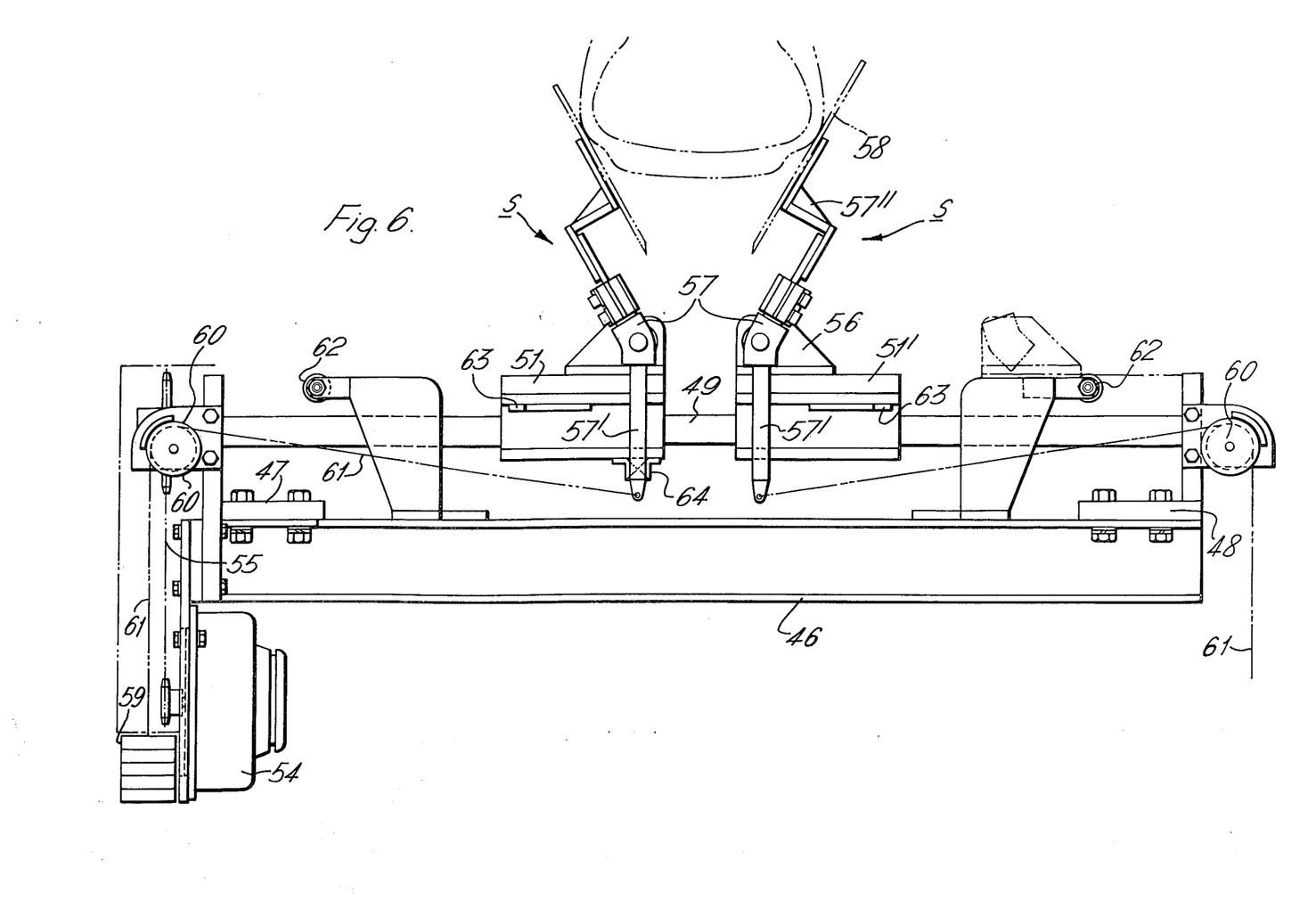
FIG. 6 is a front elevation of a side cutting post incorporated in the apparatus shown in FIG. 1.
Figures 7, 9:
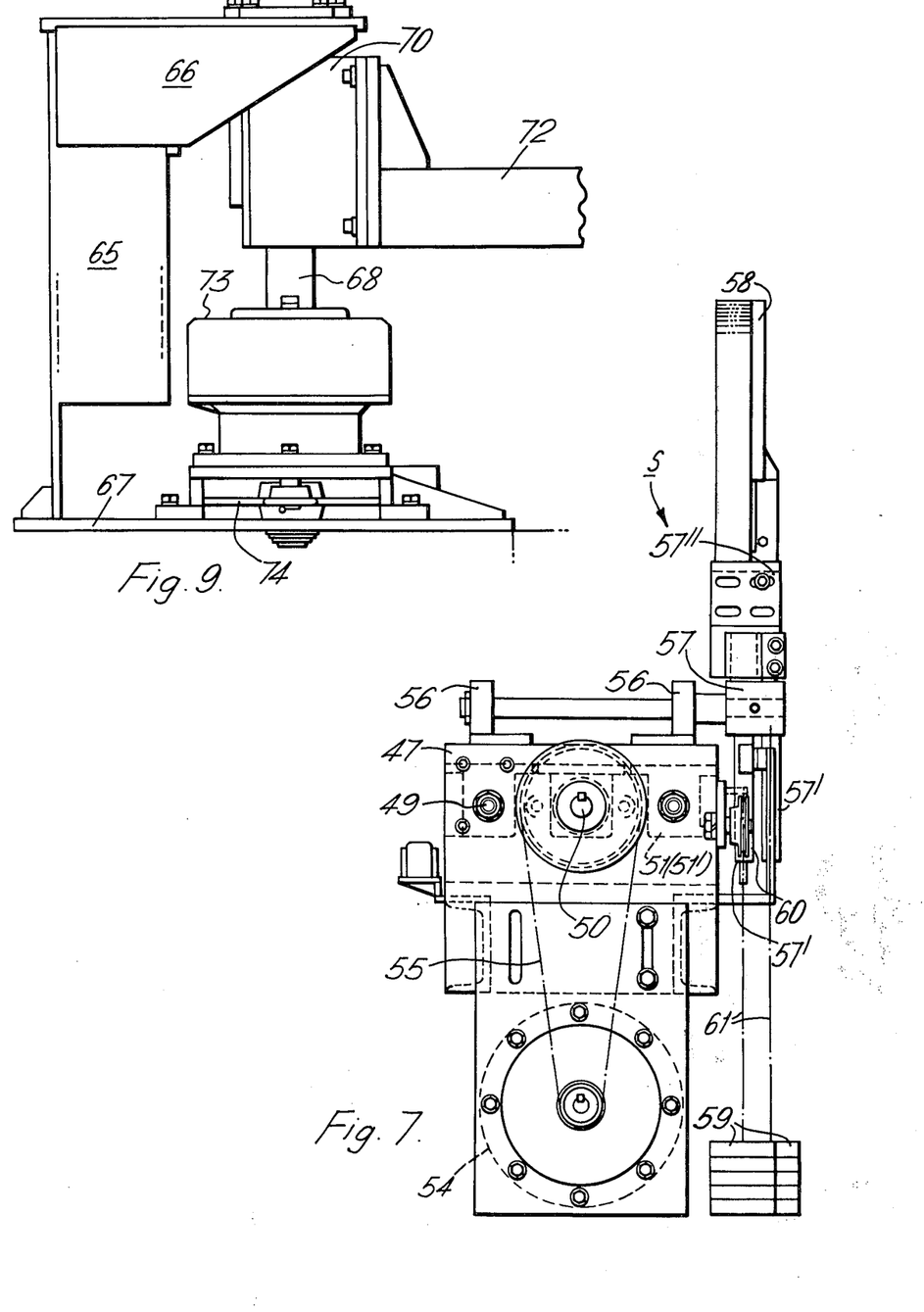
FIG. 7 is a side view of the cutting post shown in FIG. 6.
FIG. 9 is a side view of a lifter for lifting the side cutting post shown in FIG. 6.
Figure 8:
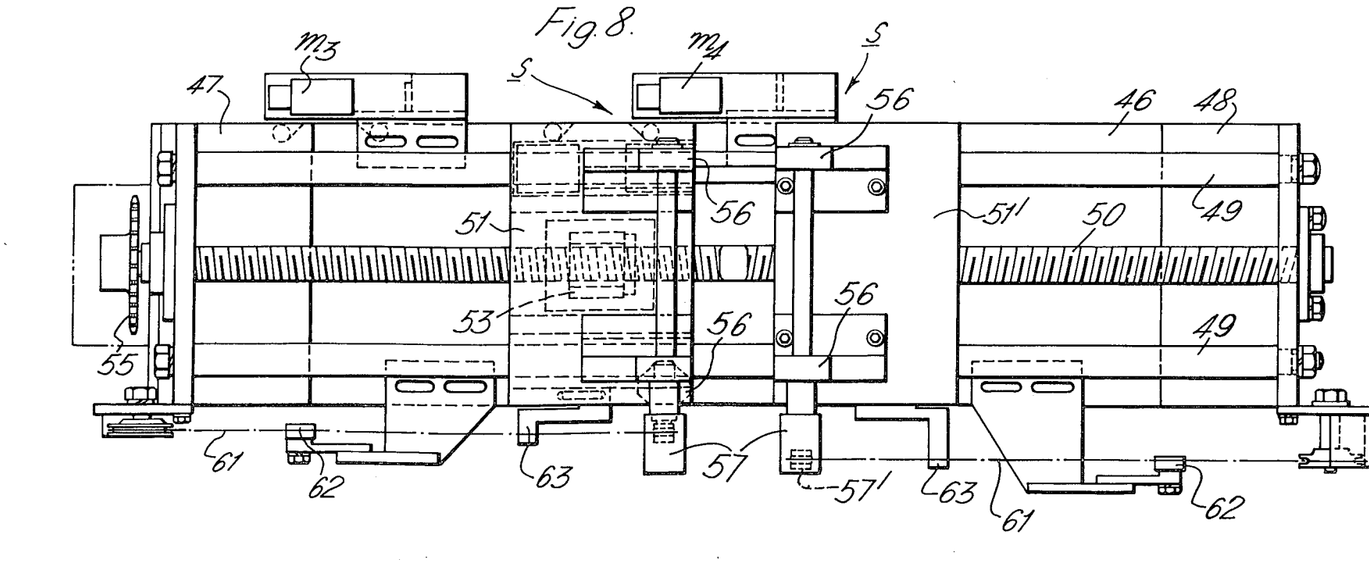
FIG. 8 is a plan view of the cutting post shown in FIG. 6.

FIGS. 6–8 illustrate the side cutting posts $s$ which comprise common guide rods 49 and a common feed screw 50 extending between angle plates 47, 48 fixed to the ends of a horizontal base 46, respectively. The feed screw 50 is formed in respective half lengths with right and left hand screw threads whereby a pair of carriages 51, 51' are moved toward and away from the set position of the tire $t$ or $t'$ by rotation of the feed screw 50 in either direction.

Nuts 53 fixed to the carriages 51, 51', respectively are threadably engaged with the feed screw 50 which is driven by a motor 54 with brake means through a chain 55 and sprockets.

The carriages 51, 51' are substantially in symmetry, each of which pivotally supports by means of bearings 56 a swingable holder 57 which carries a comblike blade 58 adapted to be brought in slight contact with the side of the tire $t$ by means of a counterbalance 59 connected through a wire 61 to the holder 57.

In the embodiment, to this end the counterbalance 59 causes tensile force in the wire 61 extending around a pulley 60, which force exerted on an arm 57' of the swingable holder 57 to pivotally move it toward the tire.

In FIG. 8, a stopper 62 for each carriage projects from a horizontal base 46 and is adapted to abut against the arm 57' of the swingable holder 57 at the instant when each of the carriages 51, 51' reaches the spacedmost position from each other to keep the blade 58 in substantially upstanding position, permitting a next tire to be introduced without any interference with the blade and a further stopper 63 is arranged on each of the carriages 51, 51' to determine an initial contact angle of the blade 58 with the side surface of the tire $t$. A switch 64 serves to stop the motor 54 for a period of time requiring for conditioning the position of the comblike blade 58 during its finishing process.

Such an intermediate conditioning of the blade is required to effect a complete trimming of spew pips on the shoulders, particularly on the recesses of buttresses of the tire. To this purpose, the method according to the invention includes an additional process to lift the side cutting posts $s$ as a unit.

Figure 10:
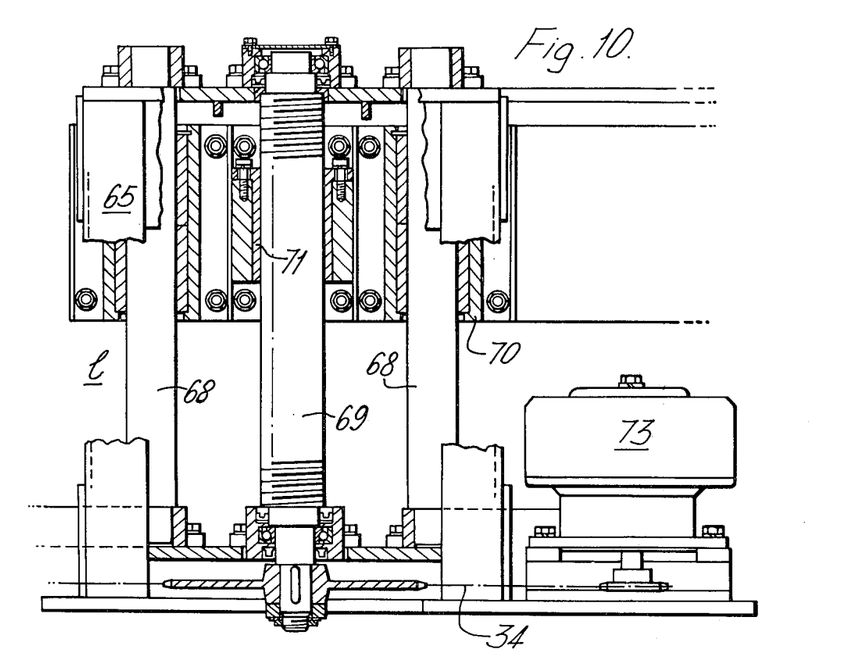
FIG. 10 is a rear elevation of the lifter shown in FIG. 9.

FIGS. 9 and 10 show a lifter $l$ which serves to lift the side cutting posts $s$. The lifter $l$ comprises a pair of guide rods 68 and a screw shaft 69 extending between a bracket 66 and a base 67 arranged at the top and bottom of a column 65 in parallel with the intermediate columns 2 of the frame 1, a lifting carriage 70 having a nut 71 threadably engaged with the screw shaft 69 slidably movable along the guide rods 68, and arms 72 projecting from the lifter for supporting the horizontal base 46 of the side cutting post $s$.

The screw shaft 69 is driven by a driving system consisting of a motor 73 with brake means, a chain 74 and sprockets.

The tire $t$ or a tire $t'$ of which diameter is less than that of the tire $t$ upstandingly rolls down on the inclined reversible chute 22 between the guide rollers 23 and is settled between the driving and driven rollers 8, 13, at which moment, the photoelectric tube 25 detects the presence of the tire and immediately actuates the thruster 16 which causes the restraining roller 18 to be lowered and brought into contact with the tread of the tire $t$ or $t'$, after which the tire is rotated through the driving roller 8 by means of the motor 4 while trimming spew pips on the tire is effected.

The rollers 8, 13 and 18 are concave in shape so that they can hold the tire in a stable condition without causing any transverse movement. During such a positioning the tire, the stopper 45 of the carriage 35 of the crown cutting post $c$ in a raised position supports substantially horizontally the swingable holder 57 and hence the comblike blade 38 to ensure that the tire $t$ or $t'$ can freely be introduced into its normal position without any interference with the blade, and the stoppers 62 of the carriage 51, 51' of the side cutting post $s$ in the spacedmost positions support substantially vertically the swingable holders 57 and hence the comblike blades 58, to ensure that the tire $t$ or $t'$ can freely be introduced into its normal position without any interference with the blades.

The crown and side cutting posts $c$ and $s$ can simultaneously start their respective trimming operations. For the sake of convenience in explanation, however, we will first explain the trimming operation at the tire tread and then explain the operation of the sides of the tire.

At the commencement of lowering movement of the carriage 35 caused by the rotation of the motor 41 in a normal direction, the stopper 43 of the carriage 35 prevents the swingable holder 37 from being pivotally moved to maintain the first contact angle $\alpha$ of the comblike blade 38 with the one shoulder of the tire $t$ or $t'$, and then just as the blade 38 comes in contact with the shoulder, the counterbalance 39 causes the blade 38 to be in slight contact with the tire tread, permitting the blade to trime spew pips which impinge in succession against the cutting edges of the blade.

During the trimming operation, the carriage 35 and hence the pivotal connection of the swingable holder 37 continue the lowering movement to cause the comblike blade 38 to sweep over the tire tread along its profile in the tangential direction, thereby the trimming process progresses in succession to enlarge the trimmed region.

In the progress of the trimming operation, when the comblike blade 38 has reached the opposite shoulder and the angle $\beta$ has become substantially equal to the angle $\alpha$, the trimming of the spew pips on the tire tread has just finished, at which moment, the switch 44 (preferably an approach switch) causes the motor 41 to drive in a reverse direction so that the carriage 35 returns to its raised position where it is ready to move for the next operation.

Limit switches $m_1$, $m_2$ are provided for stopping the motor 41 at the instant when the carriage 35 has reached its uppermost and lowermost positions.

Figure 11:
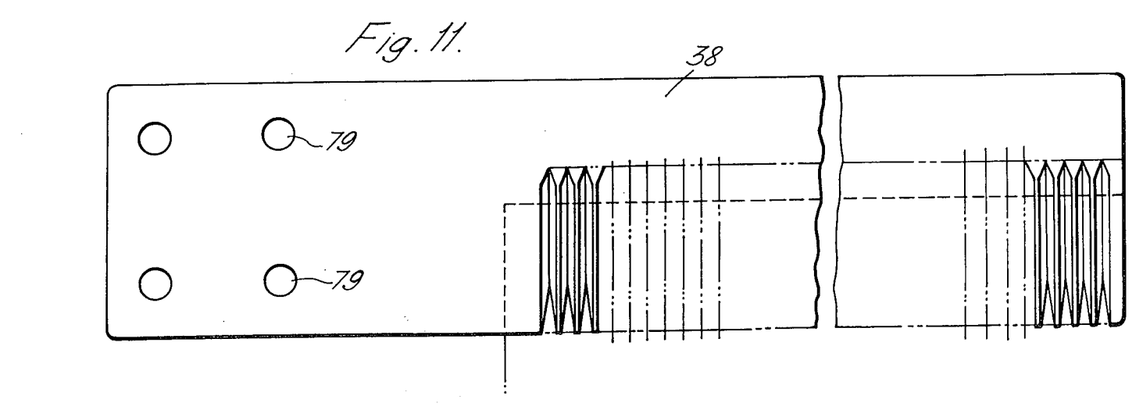
FIG. 11 is a plan view of a comblike blade used to cut spew pips on treads in the apparatus according to the invention.
Figure 12A:
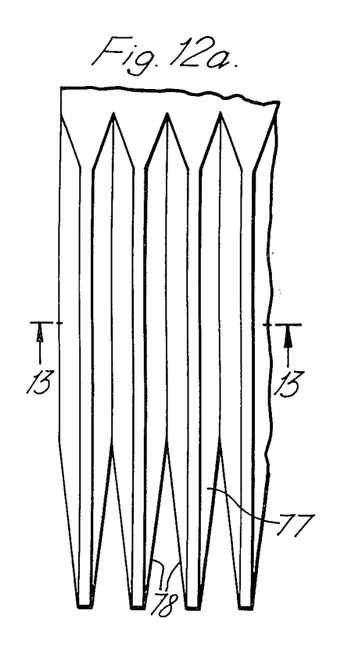
FIG. 12a is a detailed plan view, on an exaggerated scale, of cutting edges of the blade shown in FIG. 11.
Figures 12B, 13, 16:
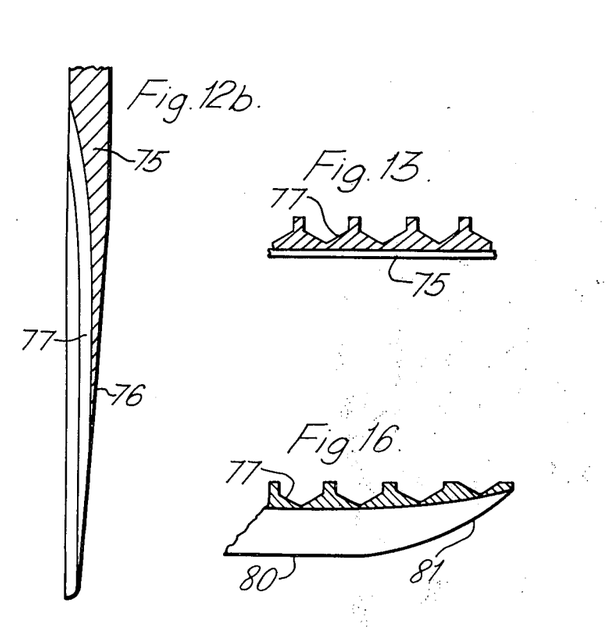

Referring to FIGS. 11–13, the comblike blade 38 consists of a flat bottom surface 75 adapted to be in contact with and sweep over the tread of the tire $t$ or $t'$, a ground surface 76 slightly inclined away from the alignment of the bottom surface 75 and V-shaped groove bottoms 77 to form a number of sharp cutting edges 78 in a row at the boundary lines of the ground surface 76 and the groove bottoms 77.

It is preferable that the effective length of each of the cutting edges 78 is sufficiently longer than, preferably twice the maximum width of a tire to be treated and the minimum height of the cutting edges 78 over the tread of the tire is approximately 1–2 mm.

As the relative position of the bottom surface 75 of the blade to the wire is invariably maintained during the rotation of the tire and the translational movement of the carriage 35, there is no longer any risk of the sharp cutting edges biting the rubber of the tire. The blade 38 is fixed to the holder 37 by means of fastening means (not shown) passing through apertures 79 formed in the blade 38.

During the progress of the above process or after the process has been completed, the carriages 51, 51' are moved on the guide rods 49 from the initial spacedmost positions toward each other or toward the side walls of the rotating tire. During such movement of the carriages toward each other or immediate before the instant when the tire $t$ or $t'$ has started rotating the photoelectric tube 26 becomes conductive to actuate a control system (not shown) which energizes the motor 73 until incident light beam in the tube 26 is interrupted by the bead of the tire to lower the side cutting posts $s$ as a unit supported on the arm 72 of the lifter $l$ with the result that the comblike blades 58 are brought into their proper positions relative to the sides of the tire in accordance with the size of the tire. To this end the photoelectric tube 26 must be secured to the side cutting post $s$ so as to be in opposition to the inner periphery of beads of the tire regardless of the size of the tire.

The comblike blades 58 which have been supported on the stoppers 62 for the initial period of the movement of the carriages are moved in its inclined position supported on the stoppers 63 toward the sides of the tire particularly the beads of the tire and touch the sides of the tire with their ends, at which moment the blades are released from the stoppers 63 and brought into slight contact with the sides of the tire owing to the tension in the wires due to the counterbalances 59, permitting the blades 58 to start trimming the spew pips on the radially inward portion of the sides or the proximity of the bead portions of the tire. The carriages 51, 51' continue their further movements to progress the trimming of the spew pips causing the trimmed region to be enlarged to the radially outward peripheries of the sides of the tire. The counterbalance 59 are raised through the wires 61 as the trimming operation progresses.

If the carriages 51, 51' should continue their movements beyond the positions shown in solid lines in FIG. 6, trimming spew pips in recesses at the buttresses of the tire $t$ or $t'$ would be incomplete.

To avoid this, when the comblike blades 58 assume the position shown in solid lines in FIG. 6 where the blades have been moved beyond the positions corresponding to the maximum width of the tire, a switch 64 interlocking the swingable holder 57 once causes the motor 54 and hence the carriages 51, 51' to stop and again energizes the motor 73 of the lifter $l$ to raise the side cutting posts $s$ to an extent that the lower side of the comblike blade 38 coincides substantially with the shoulder of the tire, whereby the lower ends of the comblike blades 58 can trim the spew pips on the recesses of the buttresses of the tire.

The raising movement of the side cutting posts *s* is controlled by the photoelectric tube 27 arranged on the side cutting post *s*.

After the trimming of the spew pips on the buttresses, the carriages 51, 51' are moved away from each other by the reverse rotation of the motor.

Figure 14:
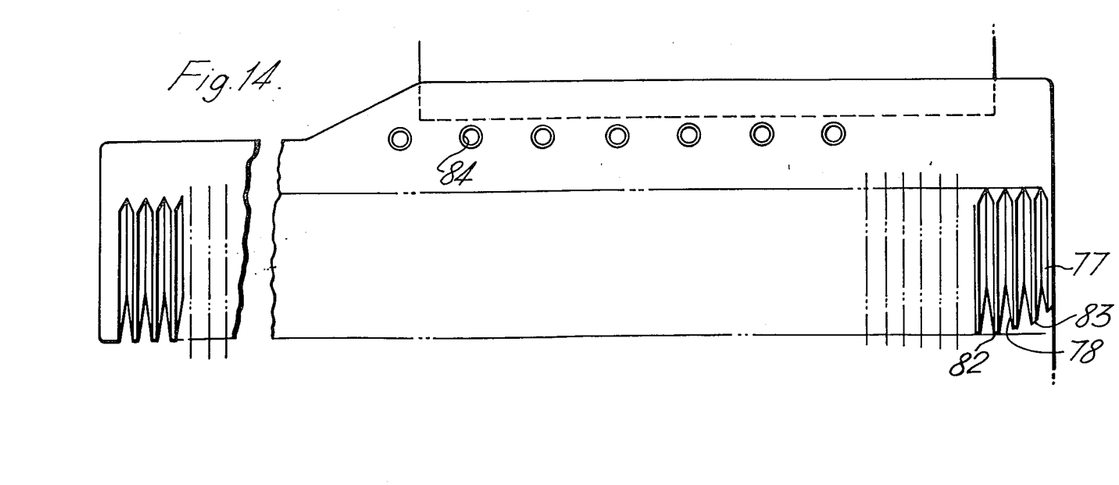
FIG. 14 is a plan view of a comblike blade used to cut spew pips on sides in the apparatus according to the invention.
Figure 15:
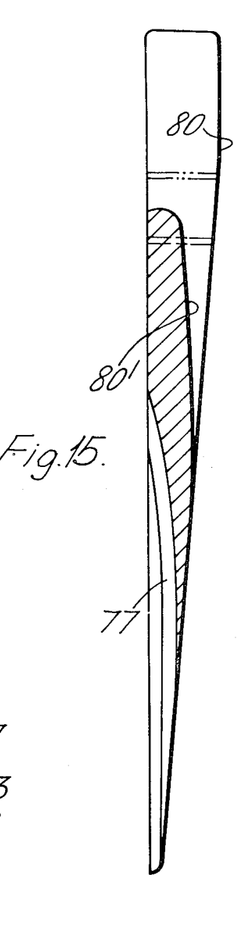
FIG. 15 is a detailed sectional view, on an exaggerated scale, of the blade shown in FIG. 14.

In order to make it possible for the comblike blades 58 to more fit the recesses of the buttress to eliminate spew pips not subjected to trimming, as shown in FIGS. 14–16 a bottom 80 of the blade is rounded off at 81 on one side adjacent to a tire in a curvature of a relatively large diameter and several tops 82 of the cutting edges adjacent to one end of the blade are arranged aligned in an arc 83.

In addition, in order to effectively perform the trimming with that portion of the blade adjacent to its mounted portion, the swingable holders 57 are offset the cutting regions by means of Z-shaped fixtures 57''. Apertures 84 are formed in the blades for mounting them on the fixtures.

Preferably, a blade bottom 80' of the front end of the comblike blade 58 is made as a convex curved surface having a large radius of curvature which first contacts the side of the tire to provide a sufficient rake at the top 82 of the blade.

Further movement of the carriages 51, 51' away from each other returns the swingable holders 57 to their initial positions, during which movement the holders are first supported on the stoppers 63 and then held in vertical position with the aid of the stoppers 62.

Limit switches $m_3$, $m_4$ in FIG. 8 serve to stop the motor 54 at the extreme positions of the carriage 51.

After trimming spew pips all over the surface of the tire has been completed as above described, the motor 4 is stopped and then the restraining roller 18 is raised by means of the thruster 16 to release the trimmed tire, after which the trimmed tire is urged toward the reversible chute 22 by the driven roller 13 caused by the operation of the thruster 11 and then the tire is delivered through the chute 22 by lowering the chute 22 by means of the thruster 21.

Then returning the thrusters 11, 21 to their initial positions brings the apparatus into position to receive a next tire to be treated. In repetition of the above operation, the trimming movement of the comblike blades is automatically accomplished wherein the blades sweep all over the surfaces of tires in accordance with varies of their sizes which are automatically detected regardless of differences in size and kind unless the difference in kind extends over an extremely wide range such as difference between tires of a general automobile and a bicycle or an aircraft.

The method and apparatus according to the invention can be applied to existing production processes to perform automatic trimming spew pips on molded and vulcanized tires in succession irrespective of their sizes and kinds thereby greatly improving the productivity in such finishing process of the tires.

What is claimed is:

1. A method of finishing pneumatic tires to trim molding spew pips and other fins from pneumatic tires rotating about their rotating axes which have been molded and vulcanized, comprising the steps of bringing cutting edges of comblike blades into slight contact with profiles in sectional planes parallel to the rotating axis in tangential direction to the profiles, said blades being mounted on swingable holders pivotally movable about axes intersecting planes including the rotating axis of the tire to be treated, and translationally moving the respective pivotal connections of said swingable holders in planes parallel to said sectional planes whereby guiding said cutting edges of said comblike blades so as to envelope said profiles of the tire.

2. A method of finishing pneumatic tires as set forth in claim 1, wherein the comblimke blade for trimming spew pips on the crown of a tire is restrained against its pivotal movement at the commencement of lowering movement of the blade and brought into slight contact with the crown of the tire after the blade has once touched the tire.

3. A method of finishing pneumatic tires as set forth in claim 1, wherein when comblike blades for trimming spew pips on the sides of the tire are positioned in their spacedmost positions, the blades are kept in substantially upstanding position, permitting a next tire to introduce without any interference with the blades.

4. A method of finishing pneumatic tires as set forth in claim 1, during trimming spew pips on the sides of the tire the movement of the blades toward each other is temporarily stopped and the blades are raised to effect a complete trimming of spew pips on the shoulder, particularly on the recesses of buttresses of the tire.

* * * * *